US008131239B1

(12) United States Patent
Walker et al.

(10) Patent No.: US 8,131,239 B1
(45) Date of Patent: Mar. 6, 2012

(54) METHOD AND APPARATUS FOR REMOTE DETECTION OF RADIO-FREQUENCY DEVICES

(75) Inventors: Aaron Lael Walker, Raleigh, NC (US); Peter Marcus Buff, III, Garner, NC (US)

(73) Assignee: Vadum, Inc., Raleigh, NC (US)

( * ) Notice: Subject to any disclaimer, the term of this patent is extended or adjusted under 35 U.S.C. 154(b) by 1232 days.

(21) Appl. No.: 11/842,264

(22) Filed: Aug. 21, 2007

Related U.S. Application Data

(60) Provisional application No. 60/822,956, filed on Aug. 21, 2006.

(51) Int. Cl.
*H04B 1/16* (2006.01)
*G01S 13/74* (2006.01)

(52) U.S. Cl. ......... 455/227; 455/90.1; 455/337; 342/44; 342/193; 340/10.42

(58) Field of Classification Search ............... 455/67.11, 455/67.13, 90.1, 227, 337, 456.4, 565; 342/193, 342/22, 44; 340/572.2, 10.42
See application file for complete search history.

(56) References Cited

U.S. PATENT DOCUMENTS

| | | | |
|---|---|---|---|
| 3,609,553 A | | 9/1971 | Frazier et al. |
| 4,053,891 A | * | 10/1977 | Opitz ........................... 342/193 |
| 4,249,167 A | | 2/1981 | Purinton et al. |
| 4,302,846 A | | 11/1981 | Stephen et al. |
| 4,303,910 A | | 12/1981 | McCann |
| 4,352,098 A | | 9/1982 | Stephen et al. |
| 4,704,602 A | | 11/1987 | Asbrink |
| 5,005,210 A | * | 4/1991 | Ferrell ........................ 455/115.1 |
| 5,106,175 A | | 4/1992 | Davis et al. |
| 5,260,690 A | | 11/1993 | Mann et al. |
| 5,414,410 A | | 5/1995 | Davies et al. |
| 5,706,010 A | | 1/1998 | Franke |
| 5,717,656 A | * | 2/1998 | Dourbal ........................ 367/128 |
| 5,815,122 A | | 9/1998 | Nurnberger et al. |
| 5,894,270 A | | 4/1999 | Clancy et al. |
| 5,905,949 A | * | 5/1999 | Hawkes et al. ............... 455/410 |
| 5,999,806 A | * | 12/1999 | Kaplan et al. ................. 455/411 |
| 6,049,301 A | | 4/2000 | Weagant |
| 6,057,765 A | | 5/2000 | Jones et al. |
| 6,060,815 A | | 5/2000 | Nysen |

(Continued)

OTHER PUBLICATIONS

A. Walker, M. Buff, and M. Steer, "Remote Detection of RF Systems Via Multi-Tone Sinusoidal Excitation," Proceedings of Government Microcircuit Applications Conf. (GOMACTech), Mar. 2004, pp. 130-133.

*Primary Examiner* — Duc M Nguyen
(74) *Attorney, Agent, or Firm* — Murphy, Bilak & Homiller, PLLC

(57) ABSTRACT

Methods and apparatus for detecting the presence of electronic communications devices, such as cellular phones, are disclosed. In an exemplary method, a complex radio frequency stimulus is transmitted into a target area, and nonlinear reflection signals received from the target area are processed to obtain a response measurement. The response measurement is compared to a pre-determined filter response profile to detect the presence of a radio device having a corresponding filter response characteristic. In some embodiments, the pre-determined filter response profile comprises a pre-determined band-edge profile, so that comparing the response measurement to a pre-determined filter response profile comprises comparing the response measurement to the pre-determined band-edge profile to detect the presence of a radio device having a corresponding band-edge characteristic.

13 Claims, 10 Drawing Sheets

U.S. PATENT DOCUMENTS

| | | | |
|---|---|---|---|
| 6,163,259 A * | 12/2000 | Barsumian et al. | 340/572.2 |
| 6,359,582 B1 * | 3/2002 | MacAleese et al. | 342/22 |
| 6,765,527 B2 * | 7/2004 | Jablonski et al. | 342/193 |
| 6,856,275 B1 | 2/2005 | Ehlers et al. | |
| 6,897,777 B2 * | 5/2005 | Holmes et al. | 340/572.2 |
| 7,035,593 B2 * | 4/2006 | Miller et al. | 455/67.11 |
| 7,464,005 B1 * | 12/2008 | Beetner et al. | 702/189 |
| 7,548,181 B1 * | 6/2009 | Bausov | 342/22 |
| 7,656,342 B2 * | 2/2010 | Stolarczyk et al. | 342/22 |
| 7,777,671 B2 * | 8/2010 | Schnitzer et al. | 342/193 |
| 2002/0094785 A1 * | 7/2002 | Deats | 455/67.3 |
| 2003/0210145 A1 | 11/2003 | Manov et al. | |

* cited by examiner

METHOD AND APPARATUS FOR REMOTE DETECTION OF RADIO-FREQUENCY DEVICES

CROSS-REFERENCE TO RELATED APPLICATIONS

This application claims priority from U.S. Provisional Application Ser. No. 60/822,956, filed on Aug. 21, 2006, which is incorporated by reference herein in its entirety.

BACKGROUND OF THE INVENTION

The present invention relates generally to methods for detecting the presence of hidden electronic devices, and more particularly relates to methods for detecting the presence of a radio-frequency device having a frequency response including a band-edge characteristic, using reflected nonlinear reflection signals.

In the past, remote detection of radio-frequency (RF) devices has focused on passive sensing of signals radiated by the target device, with a few simple active detection techniques used as well. A typical passive method employs direction finding techniques to determine the location of a transmitting RF device, using multiple signal receivers or multiple antennas connected to a single receiver. This method, of course, will fail if the hidden electronic device does not transmit RF signals, or is switched off. Active techniques, on the other hand, typically rely on nonlinear junction detection, and may be used even when the target device does not transmit or leak any RF signals, or when the device is switched off. For instance, U.S. Pat. No. 6,057,765, issued to Jones et al. on May 2, 2000, describes a nonlinear junction detector that transmits an RF signal and measures signal harmonics re-radiated by semiconductor devices included in the target device. However, this scheme suffers from false detections that frequently arise from the presence of non-electronic nonlinear junctions in the target area. For example, in an indoor environment, oxidized fasteners commonly used in constructing interior walls may cause false alarms.

SUMMARY

The present invention provides methods and apparatus for detecting the presence of electronic communications devices, such as cellular phones. In an exemplary method, a complex radio frequency stimulus is transmitted into a target area, and nonlinear reflection signals received from the target area are processed to obtain a response measurement. The response measurement is compared to a pre-determined filter response profile to detect the presence of a radio device having a corresponding filter response characteristic. In some embodiments, the pre-determined filter response profile comprises a pre-determined band-edge profile, so that comparing the response measurement to a pre-determined filter response profile comprises comparing the response measurement to the pre-determined band-edge profile to detect the presence of a radio device having a corresponding band-edge characteristic.

In several embodiments, transmitting a complex radio frequency stimulus comprises transmitting a first component at a first frequency and sweeping a second component between a second and third frequency. The first, second, and third frequencies are selected so that third-order intermodulation products of the first and second components traverse a band-edge of a predicted device response. Nonlinear reflection signals corresponding to these third-order intermodulation products are processed and compared to a pre-determined band-edge profile to detect the presence of a radio device with a corresponding band-edge response characteristic.

Several variations of these methods, as well as apparatus configured to implement these methods, are also disclosed.

DETAILED DESCRIPTION

The simple active techniques used in the past for detecting hidden electronic devices suffer from false alarms caused by non-electronic nonlinear devices. In addition, in certain applications these techniques are also likely to detect devices that are of no interest to the searcher. For instance, an operator of a secure facility, such as a prison, a military installation, or any location where confidential business meetings are held, may wish to restrict the use or possession of cellular phones, pagers, wireless personal digital assistants, or other electronic communications devices. Although active detection techniques that search only for the presence of harmonics or other nonlinear products may detect these devices, these methods may also detect electronic key fobs, digital watches, and a variety of other portable items that include nonlinear semiconductor junctions that produce nonlinear reflection signals. Unnecessary detection of these devices may be a considerable nuisance, and may in some applications be regarded as excessively intrusive.

A wireless communications device, such as a cellular phone, will produce nonlinear reflection signals when stimulated with a RF signal. A typical communications device includes a so-called front-end that includes transmitter and receiver circuitry, both of which will produce nonlinear reflections. Although the following discussion focuses on the receiver circuitry, those skilled in the art will recognize that similar analysis applies to the transmitter circuitry as well.

Figure 1:
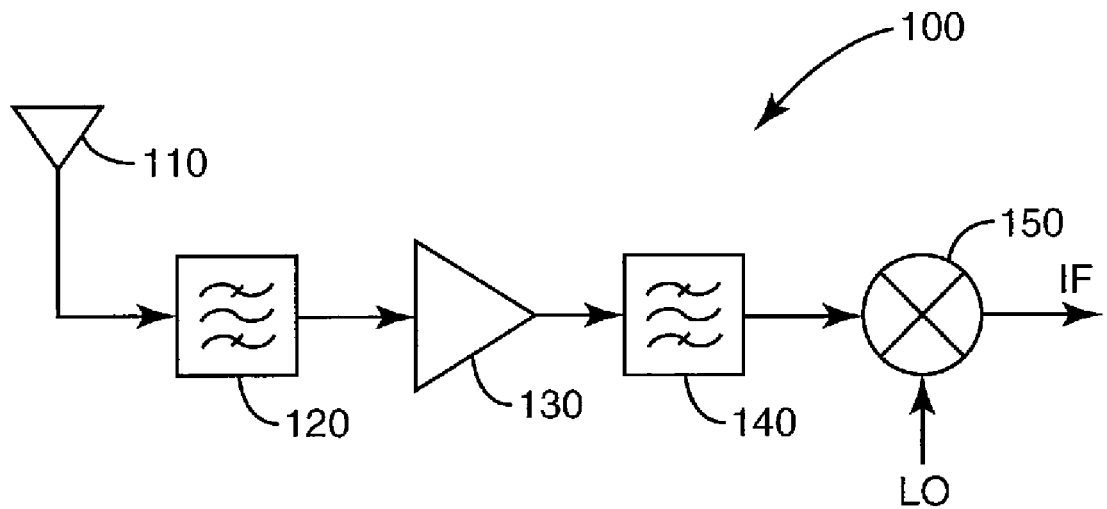
FIG. 1 is a block diagram of a typical communications receiver front-end.

FIG. 1 illustrates a block diagram of a typical RF receiver front-end, such as may be used in a cellular phone. The front-end 100 of FIG. 1 comprises a receive antenna 110, a band-select filter 120, a low-noise amplifier (LNA) 130, a band-pass filter 140, and a mixer 150. As viewed through the antenna, front-end 100 will appear as a tuned linear system followed by a nonlinear input port. In this case, the primary source of nonlinearity is the LNA 130. Whether or not the LNA 130 is active, the input port of LNA 130 appears as a nonlinear input impedance, which manifests itself as a mismatch to the linear feeding network. The mismatch results in the reflection of a portion of the incoming signal, directed back towards the antenna 110. Because of the nonlinearity of the LNA input semiconductors, the reflection contains frequency content, i.e. nonlinear products, not present in the stimulating signal. The reflected signal then radiates from antenna 110 after passing through the band-limiting filter 120. The generation of the nonlinear reflection response in general does not depend on the power state of the LNA 130 or other active devices in the RF receiver, although the details of the response will differ depending on whether the receiver is active or not.

Figure 2:
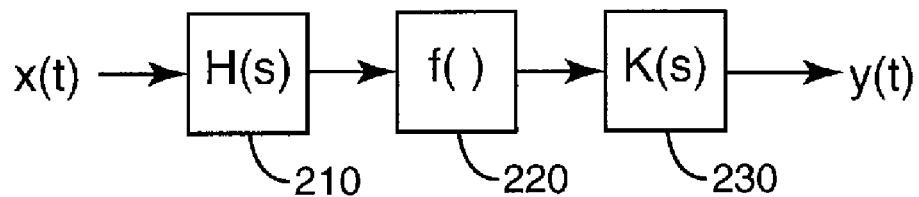
FIG. 2 illustrates a nonlinear reflection response model for a receiver front-end.

The production of additional spectral content in the nonlinear reflection signals provides a means whereby a response of the front-end 100 to a remote stimulus can be observed. However, since the receive filter 120 has a limited bandwidth, reflected signals outside the bandwidth of filter 120 will be attenuated compared to reflected signals within the passband. FIG. 2 illustrates a simplified model of the nonlinear reflection response of front-end 100, wherein x(t) represents the RF stimulus and y(t) the radiated response. At block 210, H(s) represents the response of the linear system primarily defined by the responses of the target antenna 110 and band-pass filter 120 preceding the first active device, LNA 130, in the front-end 100. At block 220, f( ) represents the active device nonlinear reflection response, generated by LNA 130. Finally, at block 230, K(s) represents the response of the input linear system when traversed in the reverse direction by the nonlinear reflection signals.

In order to generate a nonlinear response that falls within the passband of the front-end response, a complex RF signal, i.e. a signal comprising two or more components, is used as the stimulus. Because of the nonlinear products generated by the semiconductor junctions of the front-end 100, the reflected response will have a larger bandwidth than the stimulus signal. This phenomenon may be exploited to yield the information necessary to detect the presence of a hidden device.

Figure 3A:
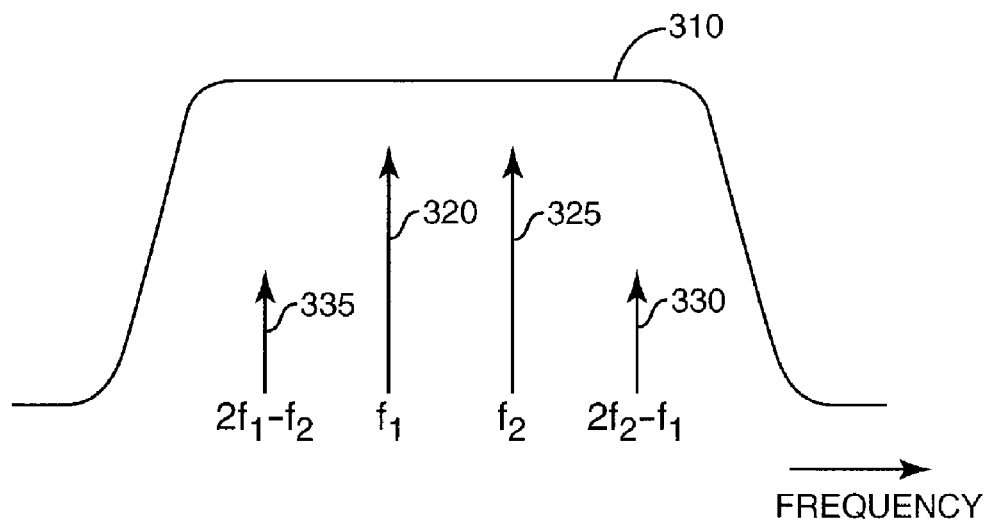
FIG. 3 illustrates exemplary relationships between stimulus signals, third-order intermodulation products, and a linear filter response.
Figure 3B:
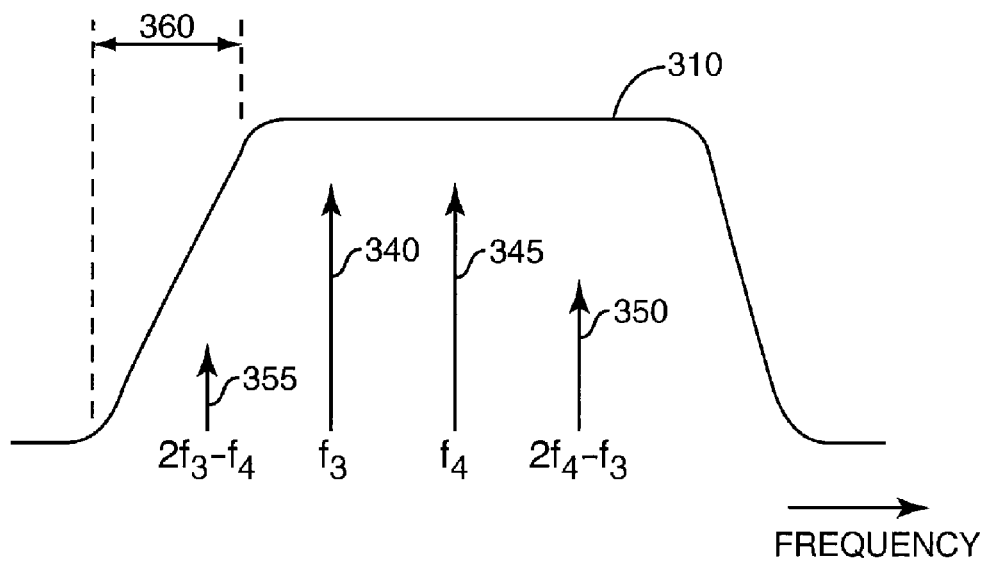

The simplest form of a complex signal is a signal obtained by combining two sinusuoidal tones at different frequencies. A multi-tone sinusoidal excitation of a nonlinear system such as illustrated by FIG. 2 creates a nonlinear reflection response that includes intermodulation products caused by the interaction of the multiple tones with the semiconductor nonlinearities. In particular, those intermodulation products include odd-order intermodulation products. If the frequencies of the stimulus tones are properly selected, the tones as well as the odd-order intermodulation products will contribute a response within the passband of the receive filter 120. The frequency separation between the two tones should be small compared to the bandwidth of the input filter 120, so that that odd-ordered intermodulation products fall within the passband and close to the primary input tones. This is illustrated in FIG. 3A. Stimulus tones 320 and 325, at frequencies $f_1$ and $f_2$, respectively, fall within the passband of the filter response 310. Third-order intermodulation products 325 and 330 also fall within the passband, at frequencies $2f_2-f_1$ and $2f_1-f_2$, respectively. In FIG. 3B, in contrast, tones 340 and 345, at frequencies $f_3$ and $f_4$, respectively, generate third-order products 350 and 355, at frequencies $2f_4-f_3$ and $2f_3-f_4$, respectively. While third-order product 350 is within the passband of response 310, third-order product 355 falls on the band-edge 360 of filter response 360. As a result, third-order product 355 is attenuated by the filter response as it passes through band-pass filter 120 to be radiated at antenna 110.

A simple model of the nonlinear frequency generation and the effect of the linear system can be constructed using the well-known polynomial representation of the semiconductor nonlinearity. For simplicity, a truncated third-order model may be used to demonstrate the nonlinear reflection response to a two-tone stimulus signal. The magnitude of the $3^{rd}$-order intermodulation response at $2\omega_2-\omega_1$ a for a stimulus composed of frequencies $\omega_1$ and $\omega_2$, where $\omega_2 > \omega_1$, can be expressed as:

$$Y_{IM3}(\omega_{\vec{m}_1}) = \frac{3}{4}a_3|A_{\omega1}|^2|A_{\omega2}||H(\omega_1)|^2|H(\omega_2)||K(2\omega_2-\omega_1)| \quad (1)$$

where $a_3$ is the cubic polynomial coefficient representing the magnitude of the $3^{rd}$-order nonlinear response, the tone magnitudes are $A_{\omega1}$ and $A_{\omega2}$, and $H(\omega)$ and $K(\omega)$ are the frequency responses of the linear system in the forward and reverse directions respectively. Equation (1) can be simplified by approximating the response of the linear system at the three frequencies to that of the response at $\omega_1$ and noting that the linear system is reciprocal. Thus:

$$Y_{IM3}(\omega_{\vec{m}_1}) \approx \frac{3}{4}a_3|A_{\omega1}|^2|A_{\omega2}||H(\omega_1)|^4. \quad (2)$$

Examination of Equations (1) and (2) reveals that the third-order intermodulation response is a straightforward function of the linear response of the front-end system. Thus, by shifting the frequency of one or both of the stimulus tones, the frequency response of the linear system at the receiver can be extracted. Because only a communications device will exhibit the clearly non-natural frequency response of a designed filter, a response from a communications device can be discriminated from other responses, whether caused by other electronic devices or non-electronic objects.

Figure 4:
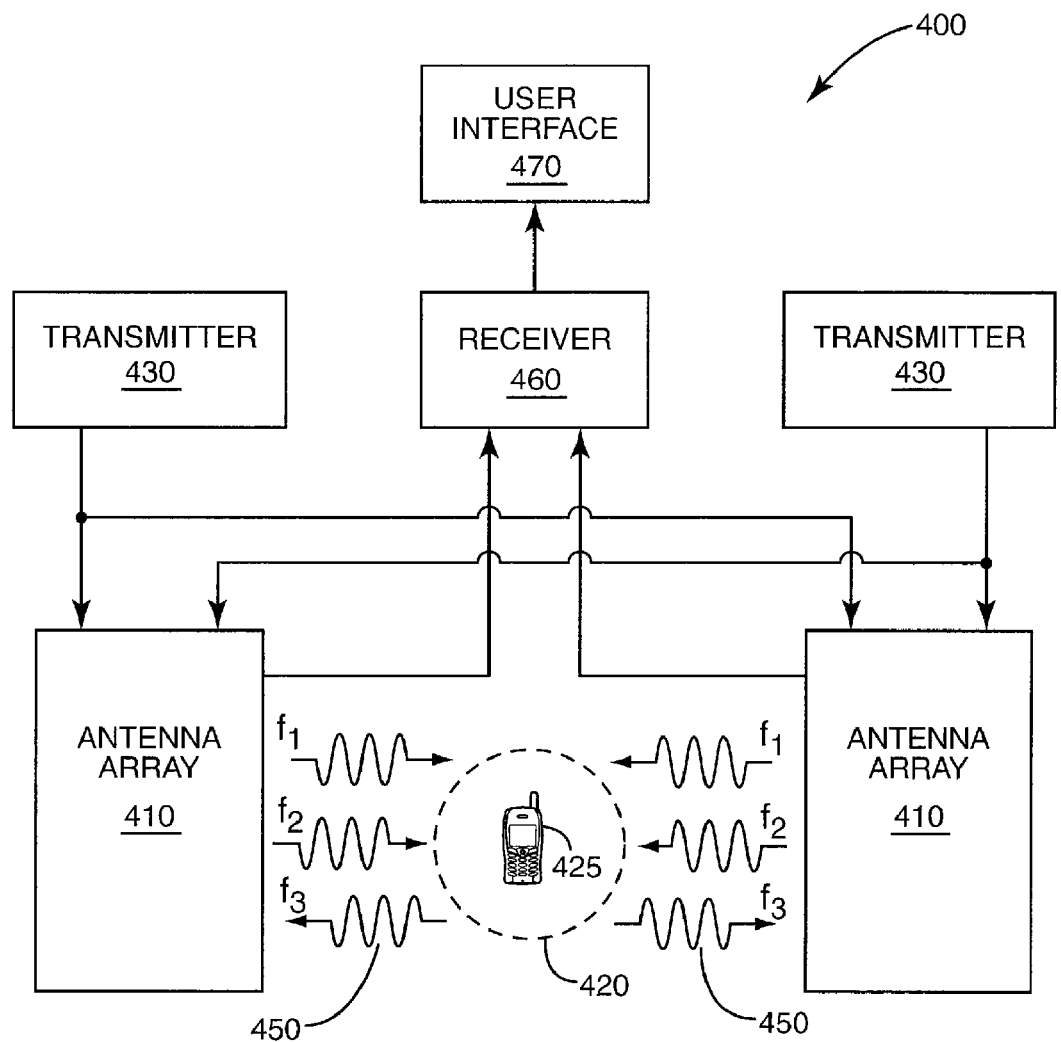
FIG. 4 illustrates an exemplary system for detecting hidden communications devices.

A block diagram of an exemplary system for detecting hidden communications devices is illustrated in FIG. 4. Detection system 400 includes two antenna arrays 410 disposed to transmit signals into and receive signals from target area 420, which contains a target communications device 425. Antenna arrays are fed with stimulus signals from transmitter 430 and transmitter 435, which supply signals at frequencies $f_1$ and $f_2$, respectively.

Transmitters 430 and 435 are physically separated in the embodiment of FIG. 4 to avoid, or at least reduce, the generation of intermodulation products within the transmitters themselves. Third-order intermodulation products generated by the detection system itself, called system-generated intermodulation (SGI) herein, is generally indistinguishable from reflected intermodulation products, and must therefore be kept to levels below the reflected levels expected from a target device such as device 425. In addition to physically isolating the transmitters 430 and 435, other techniques for minimizing SGI include: the use of separate printed circuit boards for the two transmitters, if they are not physically separated; the use of fiber optic links for control and communications between the transmitters 430 and 435 and other components of the detection system 400; the use of one or more layers of electromagnetic shielding around each transmitter; the use of band-pass filters at each transmitter output, with the filter for each transmitter designed to reject the frequencies transmitted by the other transmitter; the use of ferrite isolators between the transmitter power amplifier and the transmit antenna(s); and the use of separate transmit antennas for each stimulus tone, to reduce the coupling between the signals that would result from combining the tones before they are radiated. Those skilled in the art will appreciate the advantages and disadvantages of each of the foregoing measures, and will recognize that additional approaches to minimizing crosstalk and resulting SGI between multiple transmit signal sources may be used instead of or in addition to the preceding measures.

Multiple antenna arrays 410, each fed by both transmitters 430 and 435, are used in order to illuminate the target area 420 from several directions. Target device 425 may be shadowed by a person or another object; illumination from two or more directions reduces the probability that no stimulus signal reaches the target device 425. Thus, as shown in FIG. 4, the target area 420 is illuminated, from two different directions, by a stimulus signal comprising a first tone at frequency $f_1$ and a second tone at frequency $f_2$.

As described above, a target device 425 in the target region 420 will generate reflected nonlinear reflection signals, including third-order intermodulation products. One of those reflected products is illustrated in FIG. 4 as reflection signal 450, at frequency $f_3$. Reflection signal 450 is received by antenna arrays 410, and routed to receiver 460. Reflection signal 450 is processed by receiver 460, and, if a device is detected, a human operator is alerted using user interface 470.

Figure 5:
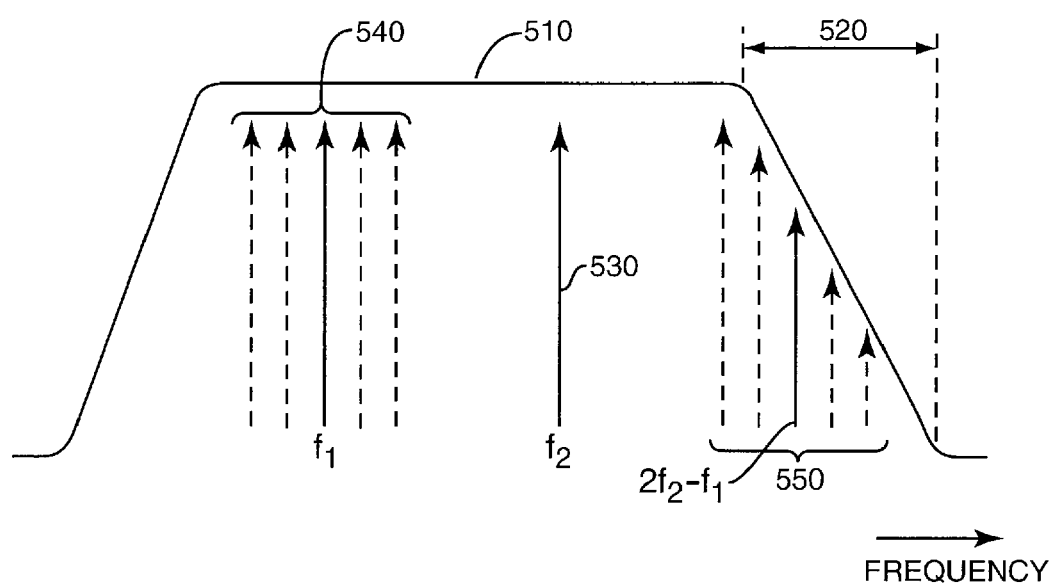
FIG. 5 illustrates a filter response, exemplary stimulus signals, and a resulting nonlinear reflection response.

FIG. 5 illustrates how the frequencies of the stimulus signal may be selected to facilitate the detection of a communications device 425 having a particular filter response characteristic. In FIG. 5, frequency response 510 represents the linear frequency response of the receiver front-end of device 425. If device 425 is a cellular phone, for example, frequency response 510 may correspond to the receive band for one or more cellular standards, such as the 800 MHz GSM band used in North America, which extends from about 869 MHz to 894 MHz. Frequency response 510 includes two band-edges, including upper band-edge 520. For the GSM example, upper band-edge 520 will begin at roughly 894 MHz and roll off as frequency increases.

Device 425 may be illuminated with a stimulus signal comprising two components, a fixed tone 530, at frequency $f_2$, and a swept tone 540. In FIG. 5, swept tone 540 is represented as a series of closely-spaced tones centered at frequency $f_1$. The upper third-order intermodulation products resulting from illuminating device 425 with this complex stimulus are also illustrated in FIG. 5. Nonlinear reflection signal 550 results from the third-order intermodulation between the two stimulus components, and is manifested as a series of closely-spaced tones centered at $2f_2-f_1$. In the illustrated example, $f_1$ and $f_2$, as well as the bandwidth over which tone 540 is swept, are chosen so that the reflection signal 550 traverses the band-edge 520. In effect, the reflection signal 550 traces out the characteristic frequency response of the device 425 front-end. Accordingly, this frequency response can be measured at receiver 460, using conventional RF signal measurement techniques. In particular, by synchronizing the measurement at receiver 460 with the sweeping of tone 540, the receiver circuitry may track the tone 540 as it is swept, facilitating narrow-band measurements for improved sensitivity and rejection of SGI.

Figure 6:
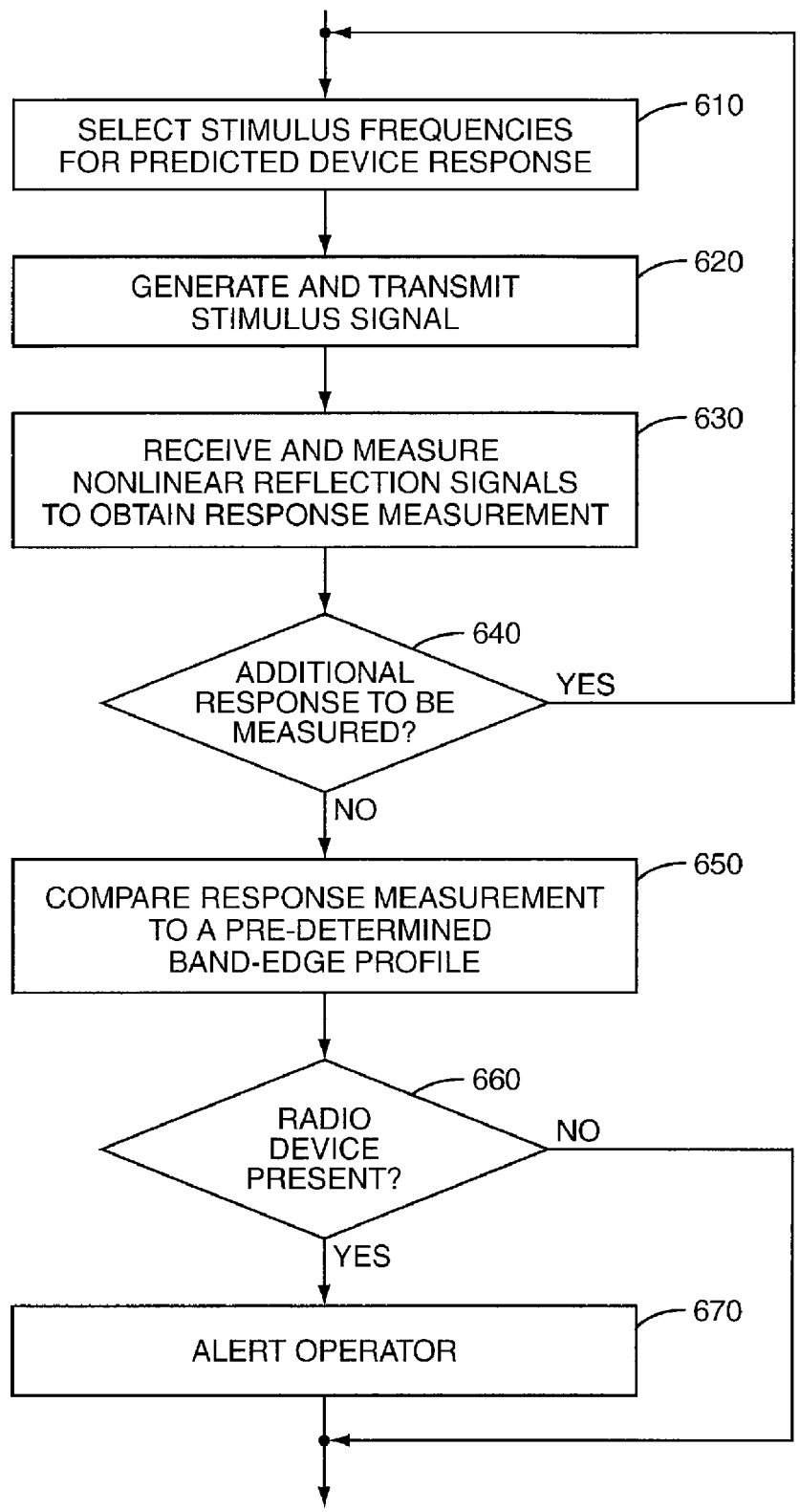
FIG. 6 is a flow diagram illustrating a method for detecting hidden communications devices according to one or more embodiments of the invention.

In FIG. 6, an exemplary method for detecting a target communications device 425 is illustrated. Although described below with respect to the detection system 400 of FIG. 4, those skilled in the art will appreciate that the described method is not limited to that system, but may be applied to detection systems of various configurations.

At block 610, stimulus frequencies are selected for the two components of the stimulus signal. As described above, one component comprises a fixed frequency tone, while the other is swept across a range of frequencies. The frequencies for each component and the frequency range across which the second component is swept are selected so that a resulting third-order intermodulation response will traverse a band-edge of a predicted device frequency response. For instance, to detect an 800-MHz GSM phone, which is predicted to have a receiver band-pass filter centered at 881 MHz, the fixed tone might be set at 885 MHz, while the other tone is swept from 870 to 880 MHz. The resulting upper third-order intermodulation products will thus traverse the upper band-edge of the predicted frequency response, sweeping from 900 to 890 MHz. At block 620, the stimulus signal is generated, using the selected frequencies, and transmitted into the target area 420.

At block 630, nonlinear reflection signals are received and measured. For the two-component stimulus described here, this measurement comprises a simple power measurement at each of the expected third-order product frequencies generated by the fixed and swept components. Typically, receiver 460 comprises a front-end filter (which may be fixed or tunable) designed to reject one or both of the stimulus tones, but to pass the desired third-order product. After downconversion, additional filtering may be applied to improve sensitivity and interference rejection. If receiver 460 is synchronized with the swept frequency generator, then very narrow-band measurements can be made. Multiple measurements may be made and averaged to reduce the effects of noise. By measuring the signal amplitude at each of the expected third-order intermodulation product frequencies as the stimulus is swept, a response measurement is thus obtained. This response measurement may comprise an array of power measurements corresponding to each frequency step of the swept stimulus signal. The sweep may be repeated several times, and the results averaged to generate the response measurement. In the system of FIG. 4, which includes two antenna arrays 410, separate sweeps are performed using each antenna array 410. The resulting measurements may be combined, or they may be compared and the best measurement retained while the other is discarded.

Detection system 400 may be configured to generate response measurements for band-edges corresponding to several predicted frequency responses. Since device 425 may contain several front-end filters, each with a different characteristic frequency response, the probability of detecting the presence of device 425 may be enhanced by obtaining response measurements for each of those predicted frequency responses. For instance, various cellular phones may exhibit one or more characteristic responses corresponding to the 800 MHz cellular receive band, the 900 MHz cellular receive and transmit bands used in Europe, the 1900 MHz cellular receive and transmit bands, and so on. Several of these bands should be swept to improve the probability that a device supporting only one or two of these frequencies is detected. Furthermore, the same device may exhibit responses corresponding to several of these bands, as well as responses corresponding to a wireless local area network transceiver, a Bluetooth transceiver, or the like. Obtaining measurement responses for several of these bands will likewise improve the probability that this device is detected. Thus, at block 640 of FIG. 6, the detection system determines whether an additional response measurement is needed. If so, then blocks 610, 620, and 630 are repeated.

At block 650, the obtained response measurement or measurements are compared to one or more pre-determined band-edge profiles, to determine whether a target device is present.

Several pre-determined band-edge profiles corresponding to predicted frequency responses for various device types may be stored in system memory for this purpose. A typical band-edge profile includes information describing expected response characteristics for a particular device type. For instance, a band-edge profile for an 800 MHz cellular may include information characterizing the expected roll-off of the upper band-edge of the cellular receive band.

In some embodiments, the pre-determined band-edge profile may simply comprise a threshold value defining a minimum expected roll-off for the measured band-edge characteristic of the target device 425. In these embodiments, amplitude measurements made at frequencies below a center band-edge frequency may be summed or averaged to obtain an "in-band" value, and compared to the corresponding sum or average of amplitude measurements made at frequencies above the center band-edge frequency. If the difference between the two sums or averages exceeds the pre-determined threshold value of the band-edge profile, then the target device 425 is detected, at block 660 of FIG. 6, and the operator of detection system 400 is alerted, at block 670, using user interface 470.

Figure 7A:
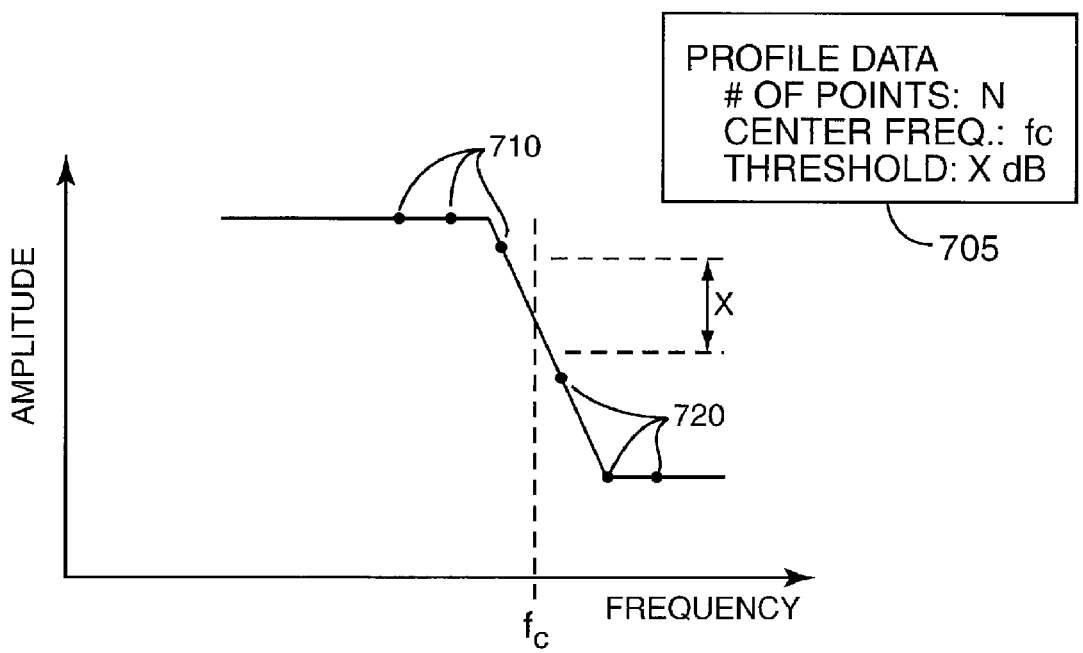
FIG. 7 illustrates approaches for evaluating response measurement data in one or more embodiments of the invention.

FIG. 7 illustrates several approaches for comparing response measurement data to a band-edge profile. In FIG. 7A, profile information 705 defining the band-edge profile comprises a number of measurement points value N, a band-edge center frequency $f_c$, and a threshold X. Measurement points 710 correspond to amplitude measurements at frequencies below the band-edge center frequency $f_c$, while measurement points 720 correspond to amplitude measurements at frequencies above the band-edge center frequency. The measured amplitude of each of the measurement points 710 are averaged (or summed, in some embodiments) and compared to the average (or sum) of measurement points 720. If the difference between the two averages (or sums) exceeds the pre-determined threshold of X dB, then the device is detected, otherwise the system analyzes any remaining response measurements.

Figure 7B:
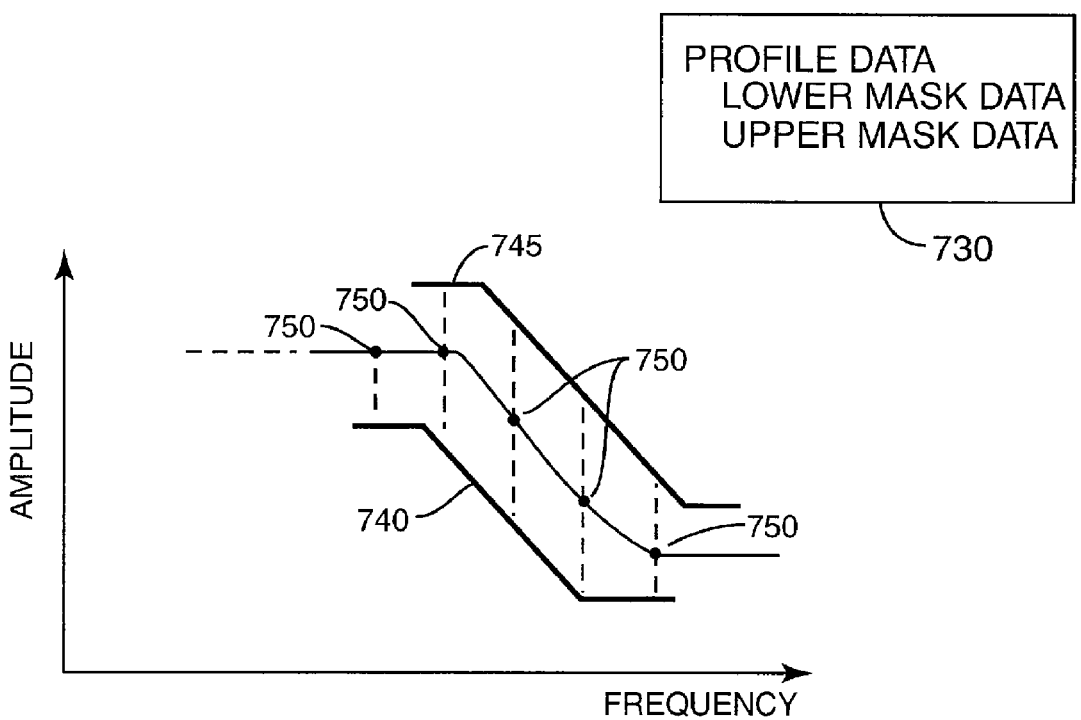

An alternative approach is illustrated in FIG. 7B, where the band-edge profile information 730 comprises information defining a lower mask 740 and an upper mask 745. Measurement points 750 are compared to the corresponding points of the lower mask 740 or the upper mask 745, or both. If all of the points 750 (or a majority, in some implementations) fall within the range defined by masks 740 and 745, then the target device is detected. If not, any remaining response measurements are analyzed.

Those skilled in the art will appreciate that numerous variations of these exemplary profiles and comparison algorithms are possible. Furthermore, various signal processing techniques for minimizing noise and interference and for enhancing the probability of detection may be applied, including the application of DSP-based filtering and spectral analysis. In particular, the probability of detecting a multi-band cellular phone may be enhanced by analyzing multiple response measurements against band-edge profiles corresponding to two or more characteristic band-edge responses for the target device type. Alternatively, the probability of false alarms may be reduced by requiring that multiple band-edge responses be detected for a single device, or by requiring that the same band-edge response be detected more than once, using successive measurements.

Figure 8:
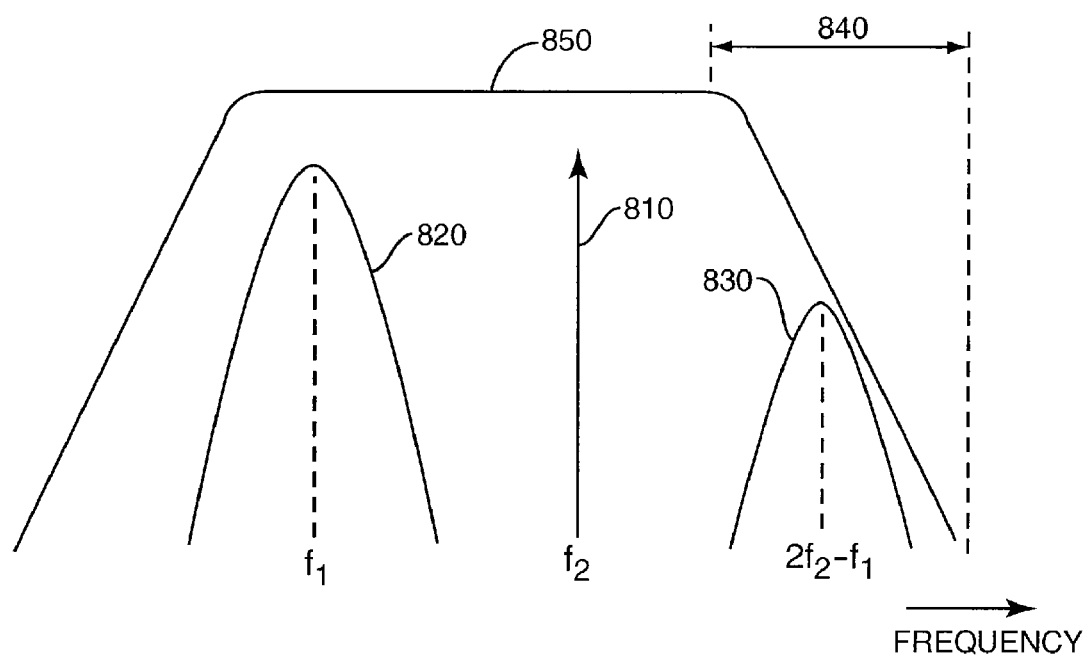
FIG. 8 illustrates the exemplary use of a modulated stimulus tone.

Other stimulus signal structures may also be used. For instance, instead of a stimulus signal composed of a fixed tone and a swept tone, an alternative signal comprising a fixed-frequency tone and a frequency-modulated tone at another fixed frequency may be used. In this embodiment, the two frequencies and the modulation bandwidth are selected so that the resulting third-order intermodulation product traverses all or part of the band-edge of a predicted frequency response. This is illustrated in FIG. 8, where tone 810 and modulated tone 820 are designed to create a third-order intermodulation product 830 that traverses at least part of band-edge 840 of the predicted device frequency response 850. If the anticipated filter response is in fact present, then the shape of the reflected signal 830 will be distorted by the band-edge 840 response. As a result, the presence of the target device can be determined by measuring and analyzing the reflected signal 840, and comparing the results to the results predicted by a pre-determined band-edge profile.

Those skilled in the art will recognize that any of a variety of modulation schemes may be employed to produce nonlinear reflection products that yield information about the linear frequency response of the target device. The measured responses in each case can be analyzed using profile data that characterizes the anticipated response from a given device type. Multiple (more than two) frequency tones may be used, one or more of which may be swept or modulated. As with the two-tone example discussed herein, the frequencies of these tones can be selected to yield information about a characteristic frequency response of the target device. Spread-spectrum modulation techniques may be used to produce a stimulus signal that is spread over a substantial bandwidth, in a manner like that described above for frequency modulation.

Similarly, pulse modulation of a carrier frequency may be employed. The radar community has demonstrated that designed pulses can elicit unique responses from different targets. The process of engineering these pulses requires a priori information about the targets of interest, with the advantage that the engineered pulses can increase the response of specific targets to increase the range or lower the transmit power required for detection of a radar target. A similar process can be utilized for detecting the nonlinear reflection response of a RF communications device. Engineered pulses cover a wide instantaneous bandwidth, allowing a rapid scan of a frequency range for the presence of a communications device. In contrast to the cross-modulation approaches described earlier, a pulse-modulated signal approach would not require a discrete frequency tone as one component of the stimulus signal. Instead, the spectral re-growth produced by the nonlinear reflection response would provide the information necessary for the detection of the predicted linear frequency response of the desired target.

Figure 9:
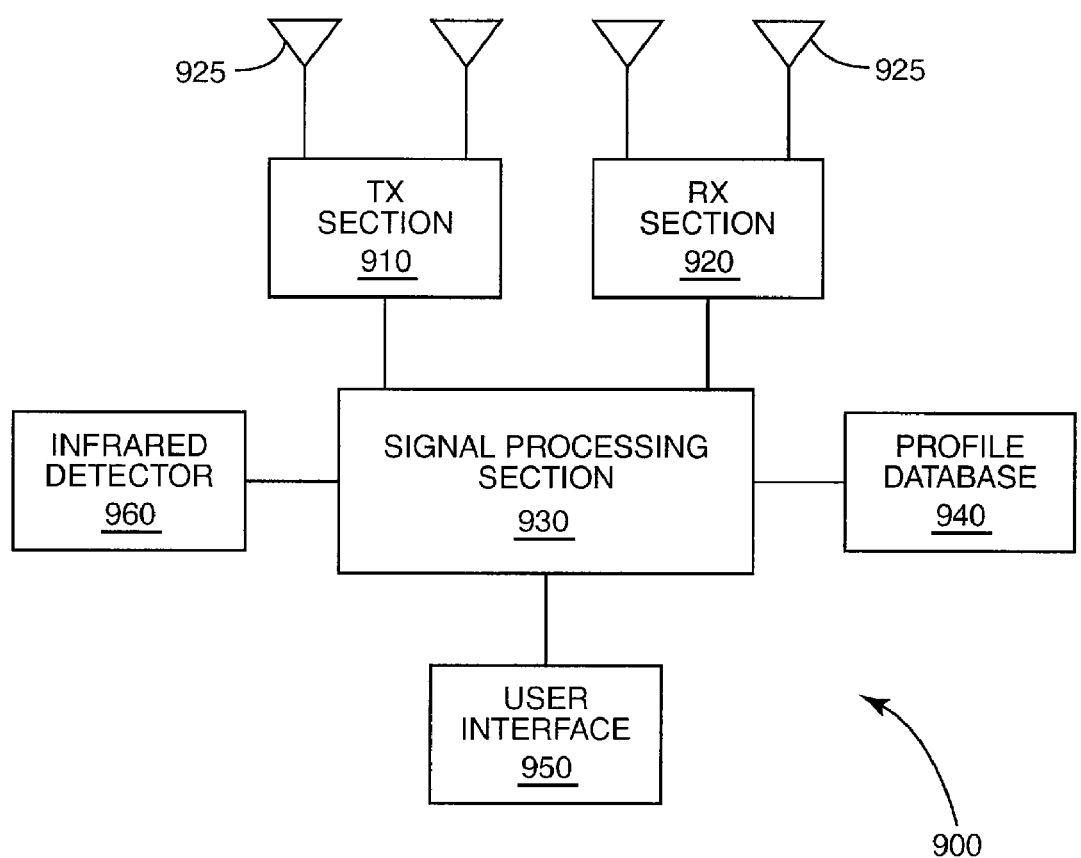
FIG. 9 is a block diagram of an exemplary detection system.

FIG. 9 illustrates the functional components of an exemplary detection system according to one or more embodiments of the invention. Detection system 900 comprises a transmitter section 910 and a receiver system 920, each connected to one or more antennas 925. Transmitter section 910 and receiver system 920 are connected to and controlled by signal processing section 930, which has access to band-edge profile information corresponding to one or more target devices, stored in profile database 940. Signal processing section 930 is also connected to user interface 950, which may comprise one or more output devices, such as a display screen, speaker, or both, to alert a human operator that a target device has been detected. User interface 950 may also comprise one or more input devices, such as a keypad, mouse, touch-screen, or the like, allowing the operator to configure and control the detection system 900. Detection system may also comprise an infrared detector 960, connected to the signal processing section 930. In some embodiments, infrared detector 960 is configured to detect that a person has entered the target area 420, and to trigger the signal processing section 930 to initiate a scan for target devices.

Transmitter section 910 comprises at least two independent transmitter chains in the exemplary system of FIG. 9. Each chain includes circuitry for generating the stimulus signals and controlling the power level of the transmitted signals. In the embodiment of FIG. 9, transmitter section 910 is controlled by signal processing section 930, although control circuitry may alternatively or additionally reside in receiver section 920. In either case, the use of a fiber optic link reduces the coupling of transmitter signals to the receiver 920 or signal processing section 930. Control commands determine the stimulus frequency generation, power levels, and trigger the initiation and cessation of signal transmission. Stimulus generation is typically performed with digitally programmable frequency synthesizers, and the power level may be controlled by adjusting bias levels in a transmitter power amplifier or by other measures well known to those skilled in the art, such as with variable-gain preamplifiers, variable attenuators, or the like. Control signals may also select the antenna or antennas used for each scan.

Figure 10:
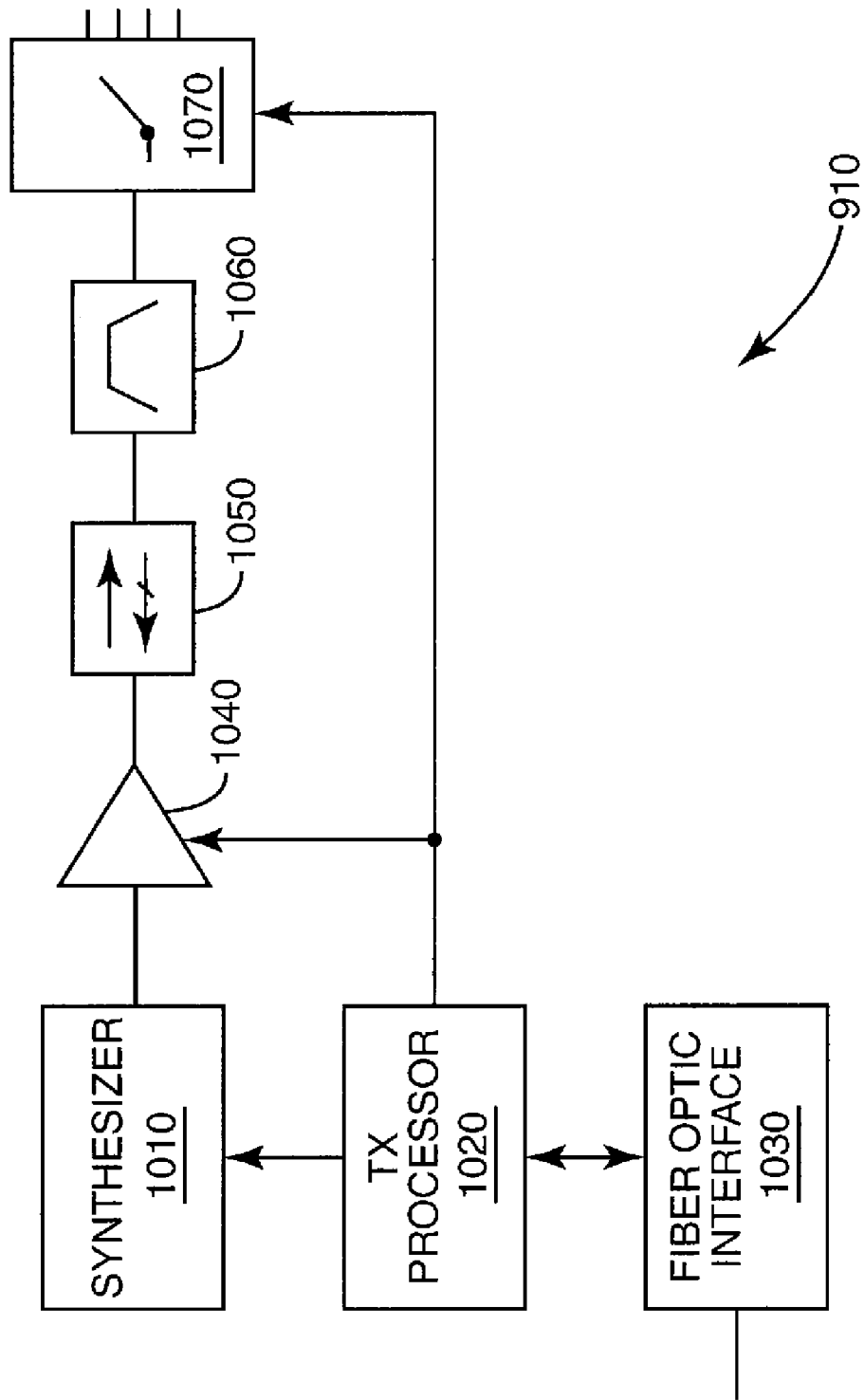
FIG. 10 is a block diagram of a transmitter section according to one or more embodiments of the invention.

Part of an exemplary transmitter section 910 is illustrated in FIG. 10. Transmitter section 910 comprises a synthesizer 1010, controlled by transmit processor 1020. Transmit processor 1020, which may comprise a microprocessor, microcontroller, hardware, or some combination of these, communicates, via fiber optic interface 1030, with signal processing section 930 and/or receiver 920. Transmit processor 1020 also controls high-power amplifier 1040, which amplifies the synthesized stimulus signal component produced by synthesizer 1010. The amplified signal passes through isolator 1050 and band-pass filter 1060, before passing through switch 1070, which selects one of several transmit antennas 925. As discussed above, transmitter section 910 typically comprises two independent transmitter chains, each containing the components illustrated in FIG. 10. This approach allows the two components of the stimulus signal to be transmitted independently, reducing SGI.

Those skilled in the art will appreciate that the transmission of modulated stimuli will produce nonlinear effects in the transmitter circuitry that are similar to the responses produced by the target radio devices. With a single continuous-wave tone, nonlinear transmitter circuits will generate harmonics of the desired stimulus frequency that do not impact the received response from the target. Transmitter circuits producing a modulated stimulus (including a stimulus comprising two continuous-wave tones) will in general produce spectral re-growth, i.e. a broadening of the frequency spectrum of the stimulus signal, as a function of the inherent nonlinear behavior of the transmitter circuit components. One approach to reducing the impact of transmitter nonlinearities is to separate the generation and transmission of the stimulus signal into a transmitter chain for an in-phase (I) component and a separate chain for the quadrature (Q) component. This approach utilizes the fact that any modulated signal (including two-tone signals, pulse-modulated signals, phase-modulated signals, etc.) can be represented as:

$$x(t) = A(t)\cos(\omega_c t + \phi(t)), \quad (3)$$

where $A(t)$ is a time-varying amplitude component, $\phi(t)$ is a phase- or frequency-modulated component, and $\omega_c$ is the carrier frequency. This expression can be separated into I and Q components, where $I(t)$ and $Q(t)$ are information-carrying baseband components of the modulated signal:

$$x(t) = I(t)\cos(\omega_c t) + Q(t)\sin(\omega_c t), \quad (4)$$

where $I(t) = A(t)\cos(\phi(t))$ and $Q(t) = -A(t)\sin(\phi(t))$.

By combining the I and Q components of the stimulus in space, after transmission by transmitter section 910, the complete modulated stimulus is presented at the target device 425 but is not produced in its entirety by either transmission chain. As a result, the nonlinear effects of the transmitter circuitry will not produce the same signals as the nonlinear response from the target. Instead the nonlinear response generated by the transmitters will appear as:

$$y_{transmitted} \propto (I_{RF})^3 + (Q_{RF})^3, \quad (5)$$

while the nonlinear response from the target device is:

$$y_{device} \propto (I_{RF} + Q_{RF})^3, \quad (6)$$

where $I_{RF}$ and $Q_{RF}$ are the modulated I and Q components at the RF carrier frequency. These responses are clearly not equal. Thus, the detection system receiver, which is subject to both the transmitted stimulus signal as well as the target response, can use the difference between the stimulus and the response to discriminate between the nonlinear effects of the transmitter and those of the target device.

Another technique for reducing the effects of SGI in transmitter section 910 is to apply pre-distortion to the generated signals prior to the final amplification by the power amplifiers 1040. If the transmitter's nonlinearities are characterized in advance, compensating components may be added to the generated stimulus signal to cancel, or at least reduce, the SGI. The stimulus signal amplified by the final power amplifier 1040 in each transmitter circuit will contain a component corresponding to the negative image of the anticipated nonlinear output products, so the resulting intermodulation products at the output of the power amplifier 1040 are cancelled or minimized.

Figure 11:
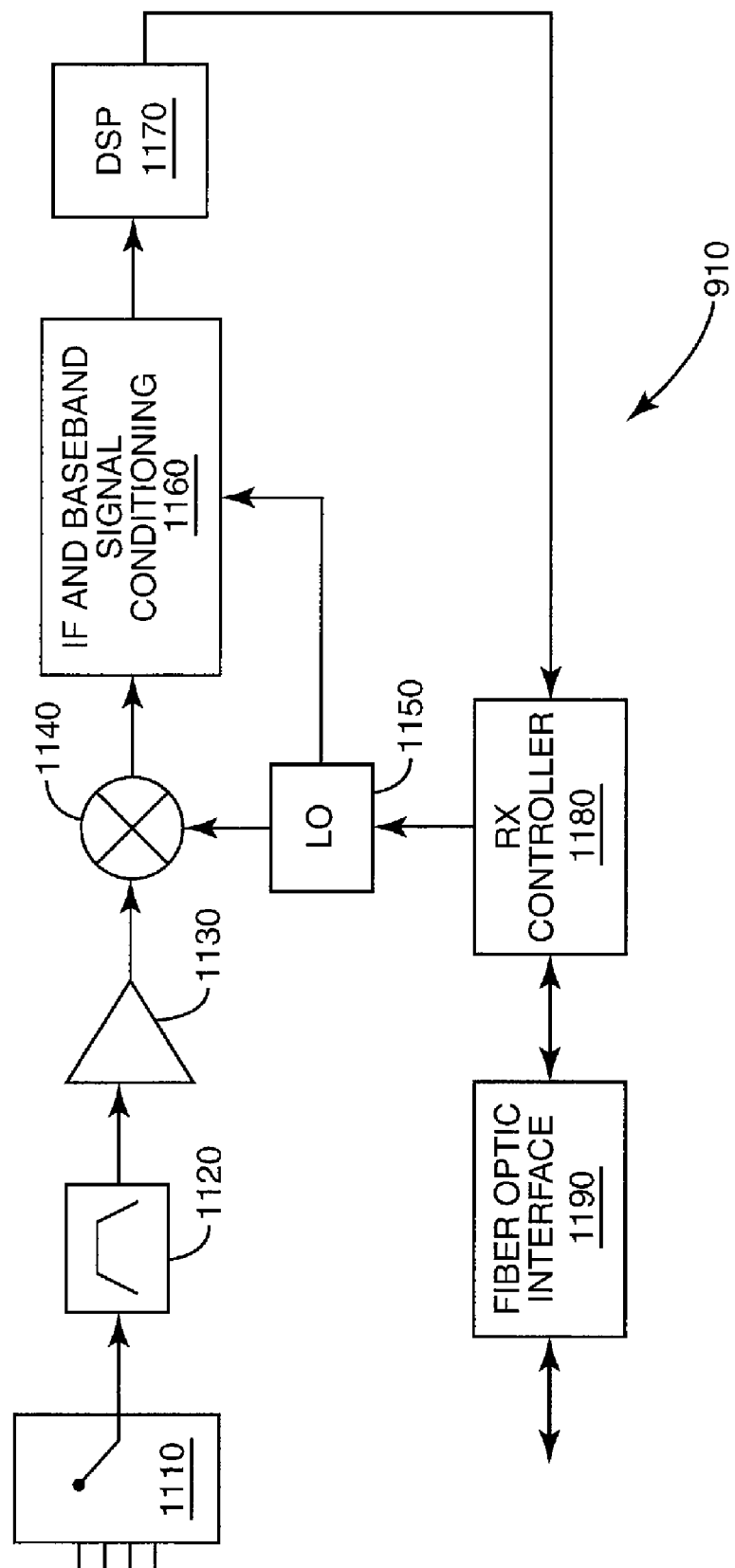
FIG. 11 illustrates an exemplary receiver section.

An exemplary receiver section 920 is illustrated in FIG. 11. Nonlinear reflection signals are received from one or more of antennas 925, and pass through switch 1110. The received signals are filtered with pre-select filter 1120, amplified at low-noise amplifier 1130, and downconverted at mixer 1140, using a local oscillator signal from LO source 1150. In systems utilizing multi-tone stimulation, receiver filter 1120 is preferably configured to reject frequencies corresponding to the stimulus signal, while passing the third-order intermodulation products, so as to minimize SGI in the receiver section 920. To accomplish this, pre-select filter 1120 may be a tunable filter, controlled to track the nonlinear reflection signal as the stimulus signal is swept. The analog downconverted signal is processed further and digitized at block 1160, and the digitized measurements fed to DSP 1170 for further processing. The resulting measurement data is passed to RX controller 1180, which controls the operation of receiver section 920 and communicates with signal processor 930, using fiber optic interface 1190. Like transmit processor 1020, RX controller 1180 may comprise a microprocessor, microcontroller, hardware, or some combination.

Advanced SGI-reduction techniques may also be applied in the receiver section 920. For instance, feed-forward stimulus cancellation may be employed to reduce SGI in the receiver 920. A portion of the stimulus signals produced by the transmitter section 910 are phase- and amplitude-shifted so that the shifted signal is equal in magnitude and out of phase with the stimulus signal received by the receive antennas 925. Combining the shifted signal with the received signal thus cancels, or at least reduces, the component in the received signal resulting from the transmitted stimulus signal, and thus lowers the power fed into the detection system receiver. This approach is particularly useful in those embodiments where receive filter 1120 cannot be designed to adequately eliminate the transmitted signals, or in those embodiments where the nonlinear reflection signals overlap in frequency with the transmitted stimulus.

Referring once more to FIG. 9, signal processing section 930 is configured to process the received signal data to obtain a response measurement and to compare the response measurement to a pre-determined band-edge profile to detect the presence of a radio device having a corresponding band-edge characteristic. As discussed above, this processing may comprise various signal processing and detection techniques, including filtering, averaging, and the like. This processing may also include the initiation of several independent scans, to detect multiple different frequency responses, or to verify a positive detection. Signal processing section 930 may comprise one or more microprocessors, microcontrollers, digital signal processors, hardware circuits, or a combination thereof. Data and programs needed for operation of signal processing section 930 are stored in one or more memory devices (not shown), which may comprise read-only memory devices, random access memory, flash memory, and the like.

Signal processing section 930 utilizes profile data, stored in profile database 940, for comparison to the response measurements. Profile database 940 typically comprises one or more memory devices, such as a hard-disk drive, flash memory, or optical memory device, configured to store profile data, and may be implemented using the same memory device or devices used for storing program code for operating signal processing section 930.

The present invention may be carried out in several other ways than those specifically set forth herein without departing from essential characteristics of the invention. Accordingly, the present embodiments should be considered in all respects as illustrative and not restrictive, and all changes coming within the meaning and equivalency range of the appended claims are intended to be embraced therein.

What is claimed is:

1. A method for detecting the presence of a radio device, comprising:

transmitting a complex radio frequency stimulus into a target area by transmitting a first component at a first frequency and sweeping a second component between a second and third frequency, wherein the first, second, and third frequencies are selected so that third-order intermodulation products of the first and second components traverse a band-edge of a predicted device response;

processing nonlinear reflection signals received from the target area to obtain a response measurement, wherein the processed nonlinear reflection signals correspond to the third-order intermodulation products and wherein the response measurement comprises a first amplitude value corresponding to at least one frequency below a band-edge of a predicted device response and a second amplitude value corresponding to at least one frequency above said band-edge; and comparing the response measurement to a pre-determined filter response profile to detect the presence of a radio device having a corresponding filter response characteristic by comparing the difference between the first amplitude value and the second amplitude value to a pre-determined threshold.

2. The method of claim 1, wherein the pre-determined filter response profile comprises a pre-determined band-edge profile, wherein comparing the response measurement to a pre-determined filter response profile comprises comparing the response measurement to the pre-determined band-edge profile to detect the presence of a radio device having a corresponding band-edge characteristic.

3. The method of claim 1, wherein processing nonlinear reflection signals comprises filtering the nonlinear reflection signals to reject the transmitted complex radio frequency stimulus.

4. The method of claim 1, wherein the response measurement comprises a plurality of amplitude values corresponding to a plurality of frequencies, and wherein comparing the response measurement to a pre-determined filter response profile comprises comparing the amplitude values to one or more masks characterizing the pre-determined filter response profile.

5. The method of claim 1, wherein transmitting a complex radio frequency stimulus comprises transmitting a first component from a first transmitter and transmitting a second component from a second transmitter chain.

6. A method for detecting the presence of a radio device, comprising:

transmitting a complex radio frequency stimulus into a target area;

processing nonlinear reflection signals received from the target area to obtain a response measurement; and comparing the response measurement to a pre-determined filter response profile to detect the presence of a radio device having a corresponding filter response characteristic;

wherein transmitting a complex radio frequency stimulus comprises transmitting a first component at a first frequency and transmitting a modulated second component at a second frequency, the modulated second component having a modulation bandwidth, wherein the first frequency, the second frequency, and the modulation bandwidth are selected so that a third-order intermodulation product produced by the first and second components has a bandwidth that substantially overlaps a band-edge of a predicted device response; and wherein the processed nonlinear reflection signals correspond to the third-order intermodulation product of the first and second component.

7. The method of claim 6, wherein the first and second components comprise quadrature and in-phase components, respectively, of the complex radio frequency stimulus.

8. An apparatus for detecting the presence of a radio device, comprising:

a transmitter section configured to transmit a complex radio frequency stimulus into a target area, the complex radio frequency stimulus comprising a first component at a first frequency and a second component swept between a second and third frequency, wherein the first, second and third frequencies are selected so that third-order intermodulation products of the first and second components traverse a band-edge of a predicted device response;

a receiver section configured to receive nonlinear reflection signals from the target area wherein the nonlinear reflection signals correspond to the third-order intermodulation products; and a signal processing section configured to process the received signals to obtain a response measurement and to compare the response measurement to a pre-determined filter response profile to detect the presence of a radio device having a corresponding filter response characteristic, wherein the signal processing section is configured to obtain a response measurement comprising a first amplitude value corresponding to at least one frequency below a band-edge of a predicted device response and a second amplitude value corresponding to at least one frequency above said band-edge, and wherein the signal processing section is further configured to compare the difference between the first amplitude value and the second amplitude value to a pre-determined threshold to detect the presence of the radio device.

9. The apparatus of claim 8, wherein the receiver section comprises a filter configured to reject the transmitted complex radio frequency stimulus while passing the nonlinear reflection signals.

10. The apparatus of claim 8, wherein the signal processing section is configured to obtain a response measurement comprising a plurality of amplitude values corresponding to a plurality of frequencies, and wherein the signal process section is further configured to compare the amplitude values to one or more masks characterizing the pre-determined band-edge profile.

11. The apparatus of claim 10, wherein the first and second components comprise in-phase and quadrature components, respectively, of the complex radio frequency stimulus.

12. The apparatus of claim 8, wherein the transmitter section comprises a first transmitter chain configured to transmit a first component of the complex radio frequency stimulus and a second transmitter chain configured to transmit a second component of the complex radio frequency stimulus.

13. An apparatus for detecting the presence of a radio device, comprising:

a transmitter section configured to transmit a complex radio frequency stimulus into a target area;

a receiver section configured to receive nonlinear reflection signals from the target area; and a signal processing section configured to process the received signals to obtain a response measurement and to compare the response measurement to a pre-determined filter response profile to detect the presence of a radio device having a corresponding filter response characteristic;

wherein the transmitter section is configured to transmit a complex radio frequency stimulus by transmitting a first component at a first frequency and transmitting a modulated second component at a second frequency, the modulated second component having a modulation bandwidth, wherein the first frequency, the second frequency, and the modulation bandwidth are selected so that a third-order intermodulation product produced by the first and second components has a bandwidth that substantially overlaps a band-edge of a predicted device response; and wherein the nonlinear reflection signals correspond to the third-order intermodulation product of the first and second component.

* * * * *